United States Patent
Doi

Patent Number: 5,088,699
Date of Patent: Feb. 18, 1992

[54] ELECTRORHEOPECTIC FLUID FILLED VIBRATION DAMPING MOUNT FOR USE WITH AUTOMOTIVE ENGINES AND THE LIKE

[75] Inventor: Kazuhiro Doi, Yokohama, Japan

[73] Assignee: Nissan Motor Company, Ltd., Yokohama, Japan

[21] Appl. No.: 545,085

[22] Filed: Jun. 28, 1990

[30] Foreign Application Priority Data

Jul. 5, 1989 [JP] Japan .................. 1-173288

[51] Int. Cl.⁵ .................. F16F 13/00; F16F 6/00
[52] U.S. Cl. .................. 267/140.1 E; 180/312; 188/267; 248/562; 248/636; 267/219
[58] Field of Search .............. 267/140.1 R, 140.1 AE, 267/140.1 E, 219; 188/267; 248/562, 636; 180/300, 312, 902

[56] References Cited

U.S. PATENT DOCUMENTS

| | | |
|---|---|---|
| 3,599,428 | 8/1971 | Chaney et al. . |
| 4,671,227 | 6/1987 | Hollerweger et al. . |
| 4,720,087 | 1/1988 | Duclos et al. .......... 188/267 X |
| 4,742,998 | 5/1988 | Schubert . |
| 4,757,981 | 7/1988 | Härtel . |
| 4,759,534 | 7/1968 | Härtel . |
| 4,773,632 | 9/1988 | Härtel . |
| 4,858,733 | 8/1989 | Noguchi et al. .......... 188/267 |
| 4,869,476 | 9/1989 | Shtarkman .......... 188/267 X |
| 4,893,800 | 1/1990 | Tabata . |
| 4,909,489 | 3/1990 | Doi .................. 267/219 X |
| 4,913,409 | 4/1990 | Doi et al. . |
| 4,919,902 | 4/1990 | Doi . |
| 4,928,935 | 5/1990 | Matsui . |
| 4,971,299 | 11/1990 | Doi . |
| 5,028,039 | 7/1991 | Sato . |

FOREIGN PATENT DOCUMENTS

| | | |
|---|---|---|
| 57-84220 | 5/1982 | Japan . |
| 60-104828 | 6/1985 | Japan . |
| 61-74930 | 4/1986 | Japan . |
| 35129 | 2/1987 | Japan .................. 267/219 |

*Primary Examiner*—George E. A. Halvosa
*Attorney, Agent, or Firm*—Pennie & Edmonds

[57] ABSTRACT

An engine mount includes a main working chamber and an expansion chamber. Orifice passages in which electrodes are disposed, fluidly connect the main and expansion chambers. An auxiliary chamber which is hermetically separated from the main working chamber by a flexible partition is in part defined by a diaphragm the external surface of which is exposed to atmospheric pressure. The auxiliary chamber contains an ERF which develops a higher viscosity than the ERF which fills the main and expansion chambers. When a voltage is impressed on electrodes in the auxiliary chamber the viscosity of the ERF increases and the flexure of the flexible elastomeric partition is prevented.

3 Claims, 4 Drawing Sheets

ELECTRORHEOPECTIC FLUID FILLED VIBRATION DAMPING MOUNT FOR USE WITH AUTOMOTIVE ENGINES AND THE LIKE

REFERENCE TO RELATED COPENDING APPLICATIONS

Copending U.S. patent application Ser. No. 07/420,250 filed on Oct. 11, 1989 in the name of Kazhiro DOI.

BACKGROUND OF THE INVENTION

1. Field of the Invention

The present invention relates generally to a vibration damping mount of the nature used for supporting internal combustion engines on automotive vehicle chassis and the like, and more specifically to such a mount which is filled with an electrorheopectic fluid (ERF), the viscosity of which can be controlled by via the impression of a voltage.

2. Description of the Prior Art

JP-A-57-84220 discloses a fluid filled mount which can be tuned to absorb a plurality of different frequencies. As shown in FIG. 6, this device, which is generally denoted by the letter M, comprises an essentially tubular elastomeric body 1 and upper and lower connection members 2, 3 which are securely attached to the open ends thereof. In this arrangement the lower connection member 2 is arranged to be connected to the vehicle chassis while the upper connection member 3 is adapted for connection to an engine or power unit (engine and transmission combination).

A diaphragm 4 and a dished circular separation plate 5 are sandwiched in the illustrated manner between the upper connection member 3 and an annular plate (no numeral) which is directly vulcanized or similarly permanently connected to the upper end of the tubular elastomeric body 1. With this arrangement a variable volume working chamber R1, an expansion chamber R2 and an air chamber Ro are defined within the mount.

The circular separation plate 5 is comprised of three members; an annular base plate member 6, a plug 7 which is press fitted into place within an annular flange (no numeral) which depends from the lower surface 6a (as seen in the drawings) of the base plate 6, and a disc like valve member 8 which is retained within a chamber defined between the plug 7 and the base plate 6.

The base plate 6 and the plug 7 are formed with essentially coaxial large diameter openings 9 and 10. The diameters of these openings 9, 10 are, as shown, both less than the diameter of the valve member 8.

An orifice opening 11 is formed in the valve member 8. The chambers R1 and R2 are filled with a suitable hydraulic fluid.

With this arrangement, upon relative displacement between the engine and the chassis, the elastomeric body 1 is subject to distortion which changes the volume of the working chamber R1. Working fluid is induced to flow between the working and expansion chambers R1 and R2.

In the case the displacement amount is low and occurs at a high frequency (viz., the mount is subject to low amplitude high frequency vibration), the flow fluid back and forth between the chambers R1 and R2 is insufficient to induce vertical displacement of the valve member 8. As a result, almost no damping effect is produced and engine vibration which tends to induce discomfort of passengers in the vehicle cabin are prevented from being transferred from the engine to the vehicle chassis.

On the other hand, when the mount is subject to vibration which exhibits a large amplitude and a low frequency, the amount of fluid which is displaced between the chambers R1 and R2 increases to a high level and the valve member 8 is induced to move up and down within the chamber in which it is confined. Upon being induced to rise into contact with the lower surface 6a and the base plate 6, the fluid which is displaced from chamber R1 is forced to pass through the orifice opening 11 into chamber R2. Conversely, when the valve member 8 is brought into contact with the plug 7, by the flow of fluid from the expansion chamber R2 back into the main working chamber R1 due to expansion of the latter, the fluid which is flowing between the chamber is forced to pass through the orifice opening 11. As a result of this, amount of force which is applied to the vehicle chassis is reduced.

However, this arrangement is such that, when the mount is subject to low amplitude low frequency vibration which tends to be generated when the engine is idling and producing vibrations in a relatively low frequency range, the pressure which develops in the main working chamber R1 is able to leak out to the expansion chamber R2 without being forced to pass through the orifice.

More specifically, when the above described type of mount is exposed to idling and engine shake type vibration in the relatively low vibration frequency zone the valve member 8 will usually be seating the lower surface 6a of the base plate 6 or the plug 7. As a result, the flow of fluid which moves between the chamber R1 and R2 passes through the orifice opening 11 and subject to a modification which dampens the transmission of vibration which tends to be transmitted to the vehicle chassis.

On the other hand, in the event of relatively high frequency vibrations which tends to cause cabin resonance noise, it is necessary to avoid the valve member 8 from being induced to contact both the lower surface 6a of the base plate 6 and the plug 7 in a manner which renders the orifice 11 active.

However, in actuality, during the application of very small vibrations which tend to be produced in the above mentioned relatively low frequency idling range, fluid tends to leak through the separation member 5 prior the valve member 8 being induced to seat on either the lower surface 6a of the base plate or the plug 7, with the result that the damping action of the orifice opening 11 is not induced during this time. Further, in the low vibration frequency range in which engine shake occurs until the valve member seats on either the lower surface 6a or the plug 7, the leakage of fluid flow also occurs and the full effect of the orifice 11 opening is not achieved and fully effective control of vibration control is not realized.

Efforts to overcome this problem have only increased the cost of the device to undesirably high levels.

SUMMARY OF THE INVENTION

It is an object of the present invention to provide a vibration damping mount which can eliminate the above mentioned leakage problems and loss of damping efficiency through the use of an ERF and a unique valve arrangement which utilizes the variable viscosity characteristics of the ERF.

In brief, the above object is achieved by an arrangement wherein an auxiliary chamber which is hermetically separated from the main working chamber by a flexible partition is in part defined by a diaphragm the external surface of which is exposed to atmospheric pressure. The auxiliary chamber contains an ERF which develops a higher viscosity than the ERF which fills the main and expansion chambers. When a voltage is impressed on electrodes in the auxiliary chamber the viscosity of the ERF increases and the flexure of the flexible elastomeric partition is prevented.

More specifically, a first aspect of the present invention comes in a mounting device which features: an elastomeric body, the elastomeric body being connected between first and second rigid connection members; means defining a main working chamber, the main working chamber undergoing a change in volume when the elastomeric body is subject to distortion due to relative movement between the first and second rigid members; means defining an expansion chamber, the expansion chamber being fluidly communicated with the main working chamber by way of an orifice passage, the main working chamber, expansion chamber and the orifice passage being filled with a first electrorheopectic fluid; and diaphragm means, the diaphragm means including a flexible partition member which is exposed to the main working chamber in a manner to be exposed to the changes in pressure which occur therein, a diaphragm exposed to the atmospheric air; a space defined between flexible partition and the diaphragm, the space being hermetically separated from the main working chamber and filled with a second electrorheopectic fluid which is capable of developing a higher viscosity than the first electrorheopectic fluid, and a first set of electrodes disposed in the space.

A second aspect of the present invention comes in the form of a mounting device for supporting a body subject to vibration on a base comprising: an elastomeric body, the elastomeric body being operatively connected between the body and the base; means defining a main working chamber, the main working chamber undergoing a change in volume when the body vibrates with respect to the base; means defining first and second auxiliary chambers, the first auxiliary chamber being fluidly communicated with the main working chamber by way of an orifice passage, the main working chamber, first auxiliary chamber, and the orifice passage being filled with a first electrorheopectic fluid; first electrode means for controlling the viscosity of the first electrorheopectic fluid in the orifice passage; diaphragm means fluidly interposed between the main working chamber and the second auxiliary chamber, the diaphragm means hermetically separating the main working chamber and the second auxiliary chamber, the diaphragm means comprising: a flexible partition member which has an outer surface exposed to the main working chamber; a diaphragm which has an outer surface exposed to atmospheric pressure, the diaphragm and the flexible partition member defining a space therebetween, the space being filled with a second electrorheopectic fluid; and second electrode means for controlling the viscosity of the second electrorheopectic fluid.

A further aspect of the present invention comes in the form of a vibration damping device comprising: an inner tubular member; an outer tubular member, the outer tubular member being disposed coaxially about the inner tubular member; an elastomeric body, the elastomeric body disposed between and connected to the inner and outer tubular members, the elastomeric body being formed with recesses which at least in part define a main working chamber, an air chamber, first and second auxiliary chambers and a first diaphragm, the first diaphragm being arranged to separate the air chamber from the first auxiliary chamber, the main working chamber and the first auxiliary chamber being filled with a first electrorheopectic fluid, the main working chamber undergoing a change in volume when the inner and outer tubular members are subject to relative displacement; an essentially annular rigid electrically non-conductive insert member disposed about the periphery of the elastomeric member and arranged to juxtapose the inner periphery of the outer tubular member; an elastomeric layer, the elastomeric layer being disposed on the inner peripheral surface of the outer tubular member, a portion of the elastomeric layer defining a second diaphragm which is exposed to the second auxiliary chamber; orifice passage means formed in the insert member for fluidly communicating the main working chamber with the first auxiliary chamber; a flexible partition member which hermetically separates the main working chamber from the second auxiliary chamber, the second auxiliary chamber being filled with a second electrorheopectic fluid; first electrode means disposed in the orifice passage; and second electrode means disposed in the second auxiliary chamber.

DETAILED DESCRIPTION OF THE PREFERRED EMBODIMENTS

Figure 1:
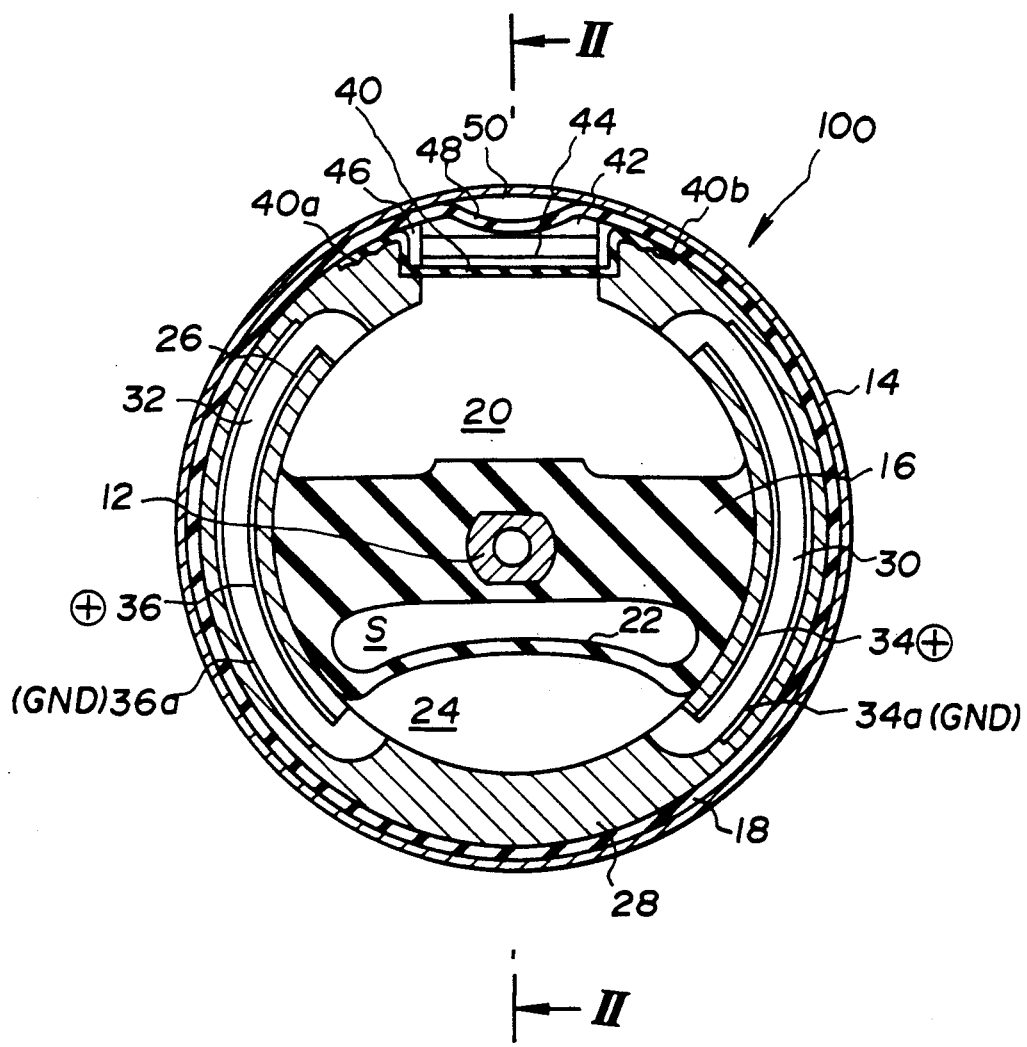
FIG. 1 is a front sectional elevation of an embodiment of the present invention.
Figure 2:
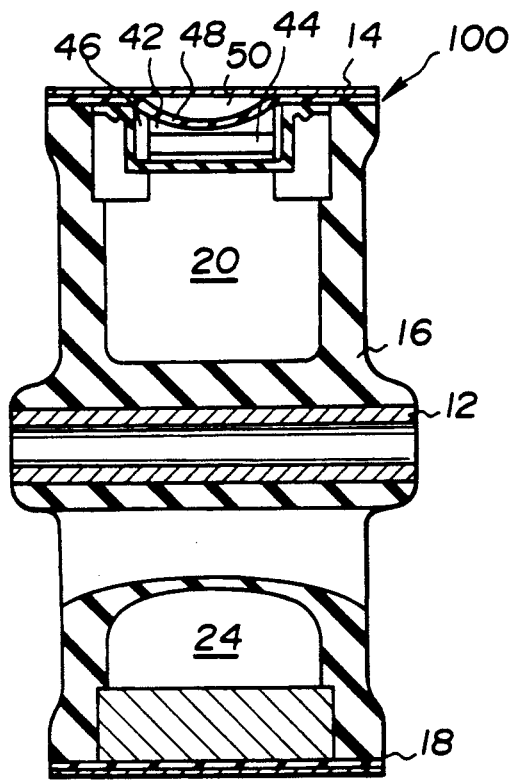
FIG. 2 is a side sectional elevation as taken along section lines II—II of FIG. 1.

FIGS. 1 and 2 show an embodiment of the present invention. In this arrangement an engine mount 100 is comprised of an inner cylindrical shaft member 12, an outer cylindrical casing 14 and an elastomeric body 16 which is disposed between the two members 12 and 14 and fixedly connected to the inner shaft member 12 by way of vulcanizing or the like.

The inner shaft member 12 in this instance is arranged to be connected to one of the power unit (viz., the engine and transmission unit) and the vehicle chassis, while the outer member 14 is arranged to be connected to the other of the two. With this connection arrangement the elastomeric body 16 supports the power unit on the chassis.

An elastomeric layer 18 is disposed about the outer periphery of the elastomeric body 16 which is then force fitted into the outer cylindrical member 14.

An essentially annular-shaped rigid non-conductive insert 28 is arranged with the elastomeric body 16 in a manner to define a main working chamber 20 and a first auxiliary chamber 24.

As best seen in FIG. 1, the elastomeric body 16 is also formed with a cavity which extends along essentially parallel with the axis of the inner shaft member 12, defines an air chamber S which is separated from the auxiliary chamber 24 by a flexible diaphragm 22. In this embodiment the first auxiliary chamber 24 acts as an expansion chamber into which fluid from the working chamber 20 can be displaced.

Arcuate orifice passages 30, 32 which, in this case, have essentially rectangular cross-sections, are defined in the annular insert 28 and arranged to provide fluid communication between the main and auxiliary chambers 30, 32.

Electrodes 34 and 34a and 36 and 36a are disposed along the inboard and outboard walls of the orifice passages 30, 32 respectively. In this embodiment the electrodes 34a and 36a which are disposed along the outboard walls are arranged to be connected to ground (or alternatively a negative terminal, while those on the inboard walls are arranged to be connected to a positive terminal of a source of high voltage.

The main and expansion chambers 20, 24 are filled with a first type of ERF. The viscosity of the ERF in the orifice passages is controlled by impressing a voltage across the electrodes 30, 32.

For disclosure relating to the manner in which the voltage can be impressed on the electrodes, reference may be had to U.S. Pat. No. 4,742,998 issued on May 10, 1988 in the name of Schubert.

Figure 4:
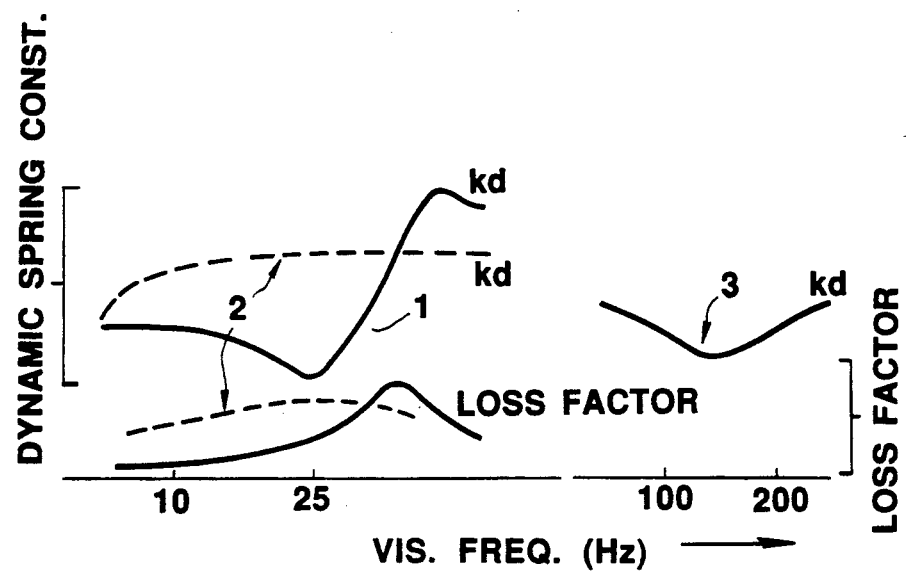
FIG. 4 is a graph which shows dynamic spring constant and loss factor characteristics which are obtained with the FIG. 1 embodiment of the present invention.

In this embodiment, the dimensions of the orifice passages 30, 32 and the expansion spring constant of the main working chamber 20 defined in the elastomeric body 16, are selected such that resonance frequency of the orifice passages falls in a 35~50 Hz range and so that when the engine is idling (e.g. 600~900 RPM) the predominate harmonic which is produced (the second harmonic in the case of a 4 cylinder 4 cycle engine) falls in the 20~30 Hz region and a low dynamic spring constant is produced (see trace 1 in FIG. 4).

The annular insert 28 is formed of an electrically non-conductive material and has an opening formed therein. The mouth of this opening is closed by flexible elastomeric sheet 40 which is sandwiched in the illustrated manner between ribbed portions formed on the external periphery of the annular insert and the elastomeric layer 18. This flexible sheet 40 partitions off a portion of the main working chamber and defines a second auxiliary chamber 42 between itself and the elastomeric layer 18.

The portion of the elastomeric layer 18 diametrically opposite the opening is arranged to act as a diaphragm which defines an atmospheric air chamber 50 between itself and the outer cylindrical member 14.

Figure 3A:
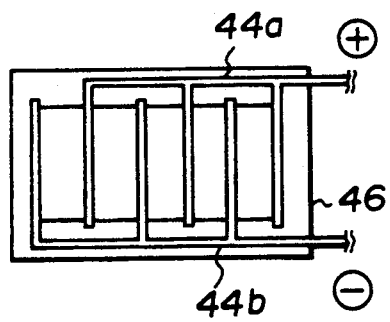
FIG. 3A is a plan view showing the arrangement of electrodes which are form part of a valve arrangement which is disposed in an auxiliary chamber and which in part characterizes the present invention.
Figure 3B:
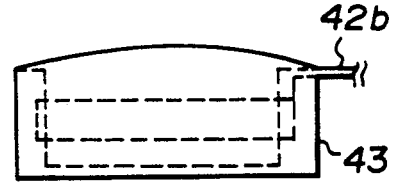
FIG. 3B is a side elevation showing the valve arrangement which is disposed in the above mentioned auxiliary chamber.

The second auxiliary chamber is filled with a second type of ERF. A so called "valve" 46 is disposed in the second auxiliary chamber 42 and arranged to span the opening formed in the annular insert 28. In this embodiment the so called "valve" includes an electrode arrangement 44 which in this case is comprised of positive and negative (ground) electrode bodies 44a and 44b which are arranged with respect to each in the manner illustrated in FIGS. 3A and 3B. The electrodes control the viscosity of the ERF contained in the second auxiliary chamber 42.

Figure 5:
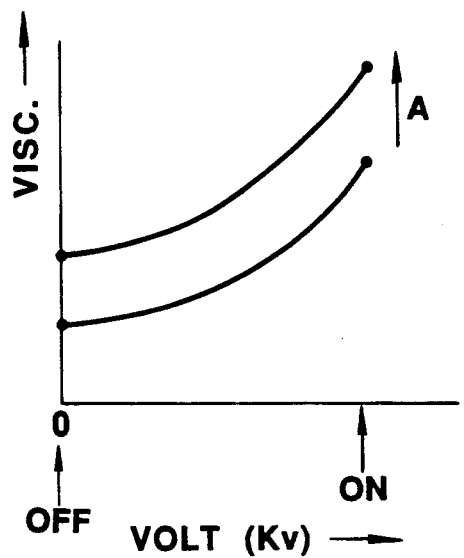
FIG. 5 is a graph which demonstrates the changes in viscosity of the ERF which occur with change in voltage which is impressed on the electrodes of the FIG. 1 embodiment.

The ERF which is contained in the second auxiliary chamber 42 is selected to exhibit greater changes in viscosity for a given voltage impression than the ERF which fills the main working chamber 20, the expansion chamber 24 and the interconnecting orifice passages. Accordingly, the voltage/viscosity characteristics shown in FIG. 5 are obtained. This enables the viscosity of the fluid in the second auxiliary chamber 42 to always exhibit a higher viscosity than the ERF in the orifice passages 30, 32 for the same voltage impression. Viz., as shown in FIG. 5, as the voltage increases the viscosity of the ERF in the orifice passages 30, 32 increases at essentially the same rate but from a lower level than that in the auxiliary chamber 42.

OPERATION

The operation of the above described arrangement is such that from the time the engine ignition is switched to the ON position, a voltage is normally impressed across all of the electrodes.

When the mount is subject to vibration produced by engine idling having a relatively small amplitude and low frequency, a non-illustrated circuit arrangement impresses a voltage across only the electrodes 44a and 44b. Under these conditions, the viscosity of the ERF in the second auxiliary chamber 42 rapidly increases to a near solid state and induces the second auxiliary chamber 42 to undergo what is referred to as "stick".

Figure 6:
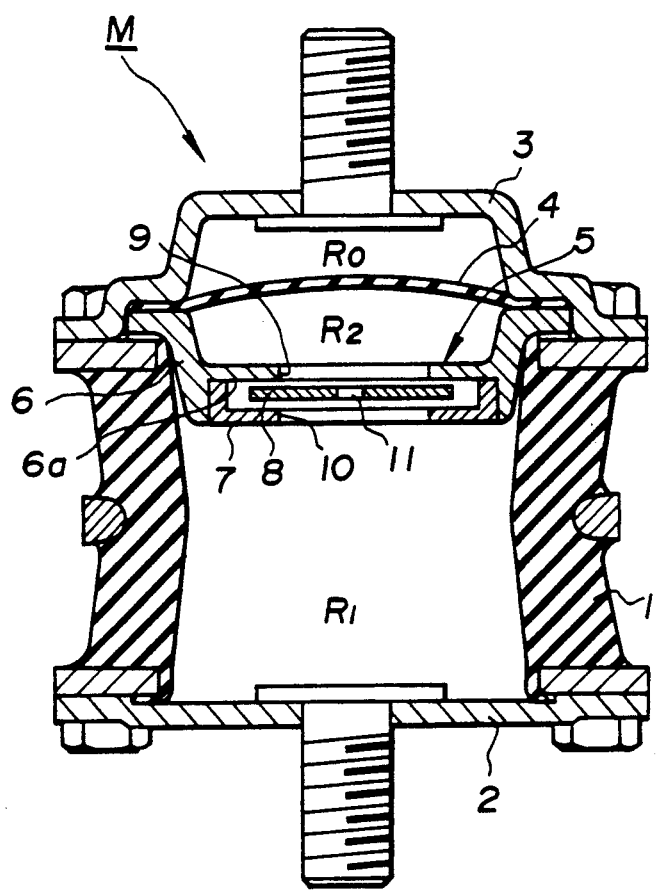
FIG. 6 is a front sectional elevation of the prior art arrangement which was discussed in the opening paragraphs of the instant disclosure.

With the second auxiliary chamber ERF so conditioned, the partitioning elastomeric sheet 40 is inhibited from undergoing any particular flexure. As a result of this, any reduction of fluid displacement between the main and expansion chambers 20, 24 (such as caused by the leakage in the FIG. 6 prior art arrangement) is prevented, and the efficiency with which vibration energy is converted into fluid motion by the resonance of slugs or column of fluid in the orifice passages is increased.

As indicated in FIG. 4 by trace ① when the mount is subject to engine idling type vibrations wherein the frequency of the second harmonic falls in the 20~30 Hz range, it is possible to induce the dynamic spring constant of the mount to assume a low level and to attenuate the transmission of vibration from the engine or power unit to the chassis. In other words, as the viscosity of the ERF in the orifice passages 30, 32 is low due the absence of a voltage being impressed across the electrodes 34, 34a and 36, 36a the amount of fluid which can be induced to resonate back and forth through the passages tends to maximize and thus result in the low dynamic spring constant.

In the event that the vibrational energy which is applied to the mount exhibits a relatively low frequency but a large amplitude, all of the electrodes have a voltage impressed thereacross. Under these circumstances, the viscosity of the ERF in the auxiliary chamber is maintained at a high level thus preventing the partitioning elastomeric sheet 40 from undergoing any flexure, and the viscosity of the ERF in the orifice passages 30, 32 rises to a predetermined level.

At this time, even thought the viscosity of the ERF in the orifice passages 30, 32 is less than that of the ERF in the auxiliary chamber 42, the second orifice passages exhibit a high flow resistance and thus induces any tendency for fluid to be displaced between the working and expansion chambers 20, 24 to be subject to a high flow resistance which induces a high damping effecting to be generated. As a result the dynamic spring constant and the loss factor of the mount both exhibit increased values as indicated by the chain line traces ②  in FIG. 4.

Further, when vibration in the relatively high vibration frequency which produces reverberation and/or acceleration noise is applied to the mount, none of the electrodes have a voltage impressed thereon. Accordingly, all of the ERF in the mount assumes a low viscous state. Under these conditions the viscosity of the ERF in the auxiliary chamber lowers thus rendering the partitioning elastomeric sheet 40 flexible. As the "valve" is now "open", changes of pressure in main working chamber are thereof able to "leak off" (induce flexure of the flexible sheet 40) and reduce the amount of fluid which tends to be pumped back and forth between the main and expansions chambers 20, 24. Viz., cause the deflection of the partitioning elastomeric sheet 40, the diaphragm 48 and the now fluid ERF retained therebetween, to permit pressure changes in the main working chamber to be transmitted to the atmospheric air chamber 50.

The mount therefore exhibits a reduced dynamic spring constant in this zone as indicated by trace ③ in FIG. 4.

The following table shows the above mentioned combination of electrode energizations.

TABLE

|  | ORIFICE ELECTRODES | VALVE ELECTRODES |
| --- | --- | --- |
| IDLING | OFF | ON |
| ENGINE SHAKE | ON | ON |
| REVERB/ACCEL | OFF | OFF |

In summary, the present invention is such that a flexible partition which is exposed to the main working chambers and a diaphragm which is exposed to atmospheric pressure on one side, define therebetween a space or auxiliary chamber which is filled with an ERF which can develop a viscosity higher than the one which is forced back and forth between the main and expansion chambers. Electrodes, which in combination with the ERF in auxiliary chamber define a "valve" arrangement which permits the flexible partition to be selectively rendered flexible or inflexible. While the flexible partition is rendered flexible the pressure changes which occur in the main working chamber induced the flexible partition, the diaphragm and the fluid retained therebetween, to flex as if were in essence just a kind of fluid filled diaphragm. This flexure "leaks off" some of the pressure in the main working chamber and reduces the amount of fluid which is forced back and forth through the orifice passages which lead to the expansion chamber.

When the so called "valve" is closed by applying a high voltage across the electrodes in the auxiliary chamber and inducing the ERF therein to assume a highly viscous state, flexure of the flexible partition is inhibited and pressure "leakage" is prevented. This maximizes the amount of fluid which is forced back and forth through the orifice passages for a given change in the pressure in the main working chamber.

In addition to this it is further possible to impress a voltage across the electrodes in the orifice passages and thus raise the viscosity of the ERF therein. This greatly increases the resistance to flow between the main and expansion chambers and in combination with the closed "valve" increases the rigidity and damping function of the mount.

What is claimed is:

1. A mounting device comprising:

an elastomeric body, said elastomeric body being connected between first and second rigid connection members;

means defining a main working chamber, said main working chamber undergoing a change in volume when said elastomeric body is subject to distortion due to relative movement between said first and second rigid members;

means defining an expansion chamber, said expansion chamber being fluidly communicated with said main working chamber by way of at least one orifice passage, said main working chamber, said expansion chamber and said orifice passage being filled with a first electrorheopectic fluid which exhibits first voltage/viscosity characteristics;

a first set of electrodes disposed in said at least one orifice passage for selectively applying a voltage to said first electrorheopectic fluid occupying in said at least one orifice passage; and diaphragm means, said diaphragm means including:

a flexible partition member which is exposed to said main working chamber in a manner to be exposed to the changes in pressure occurring therein, a diaphragm exposed to the atmospheric air;

a space defined between said flexible partition and said diaphragm, said space being hermetically separated from said main working chamber and filled with a second electrorheopectic fluid which exhibits second voltage/viscosity characteristics, which develops a higher viscosity than said first electrorheopectic fluid for a given applied voltage, and a second set of electrodes disposed in said space for selectively applying a voltage to said second electrorheopectic fluid occupied in said space.

2. A mounting device for supporting a body subject to vibration on a base comprising:

an elastomeric body, said elastomeric body being operatively connected between said body and said base;

means defining a main working chamber, said main working chamber undergoing a change in volume when the body vibrates with respect to said base;

means defining first and second auxiliary chambers, the first auxiliary chamber being fluidly communicated with said main working chamber by way of at least one orifice passage, said main working chamber, first auxiliary chamber, and said orifice passage being filled with a first electrorheopectic fluid which exhibits first voltage/viscosity characteristics;

first electrode means for controlling the viscosity of the first electrorheopectic fluid in said orifice passage, said first electrorheopectic fluid undergoing a first change in viscosity when a predetermined voltage is impressed across said first electrodes; and diaphragm means hermetically separating the main working chamber and the second auxiliary chamber, said diaphragm means comprising:

a flexible partition member which has an outer surface exposed to the main working chamber;

a diaphragm which has an outer surface exposed to atmospheric pressure, said diaphragm and said flexible partition member defining a space therebetween, said space forming said second auxiliary chamber which is filled with a second electrorheopectic fluid which exhibits second voltage/viscosity characteristics; and second electrode means for controlling the viscosity of the second electrorheopectic fluid, said second electrorheopectic fluid undergoing a second change in viscosity when said predetermined voltage is impressed across said second electrodes, said second change in viscosity being greater than the first change in viscosity.

3. A vibration damping device comprising:

an inner tubular member;

an outer tubular member, said outer tubular member being disposed coaxially about said inner tubular member;

an elastomeric body, said elastomeric body disposed between and connected to said inner and outer tubular members, said elastomeric body being formed with recesses which at least in part define a main working chamber, an air chamber, a first auxiliary chamber and a first diaphragm, the first diaphragm being arranged to separate the air chamber from the first auxiliary chamber, the main working chamber and the first auxiliary chamber being filled with a first electrorheopectic fluid which exhibits a first voltage/viscosity characteristic, said main working chamber undergoing a change in volume when said inner and outer tubular members are subject to relative displacement;

an essentially annular rigid electrically non-conductive insert member disposed about the periphery of said elastomeric member and arranged to juxtapose the inner periphery of said outer tubular member;

an elastomeric layer, said elastomeric layer being disposed on the inner peripheral surface of said outer tubular member, a portion of said elastomeric layer defining a second diaphragm;

orifice passage means formed in said insert member for fluidly communicating the main working chamber with the first auxiliary chamber;

a flexible partition member being formed between said second diaphragm and said main working chamber, a space between said flexible partition member and said second diaphragm defining a second auxiliary chamber, said flexible partition member hermetically separating the main working chamber from the second auxiliary chamber, said second auxiliary chamber being filled with a second electrorheopectic fluid which exhibits a second voltage/viscosity characteristic;

first electrode means disposed in said orifice passage for selectively imparting a predetermined voltage to the first electrorheopectic fluid occupying said orifice passage; and second electrode means disposed in said second auxiliary chamber for selectively imparting said predetermined voltage to said second electrorheopectic fluid occupied in said second auxiliary chamber.

* * * * *